Jan. 30, 1962 — C. W. ABRELL — 3,018,842
MOTOR DRIVEN FIXTURE SCAFFOLD
Filed Aug. 31, 1959 — 3 Sheets-Sheet 1
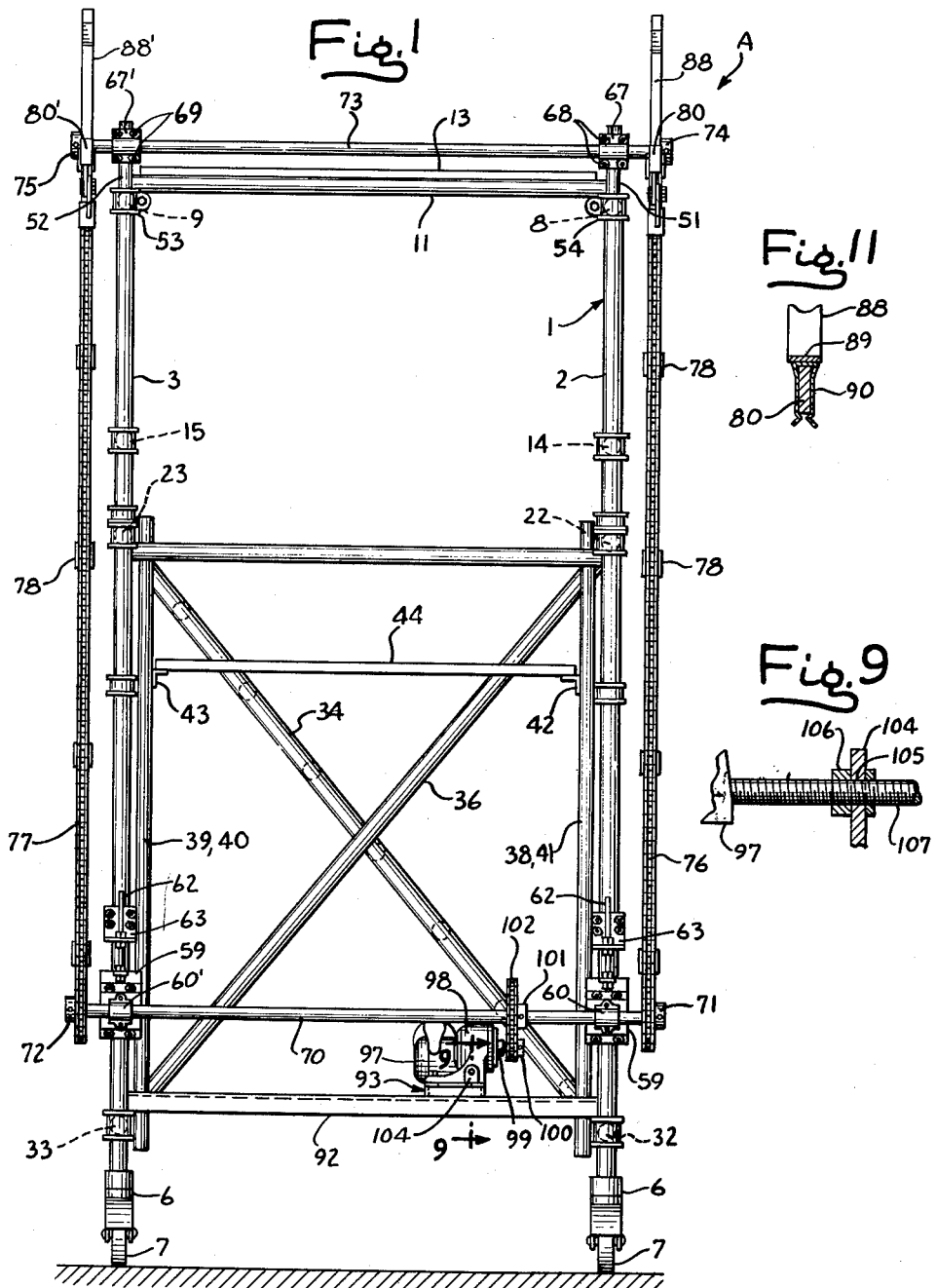
INVENTOR.
CORNELIUS W. ABRELL

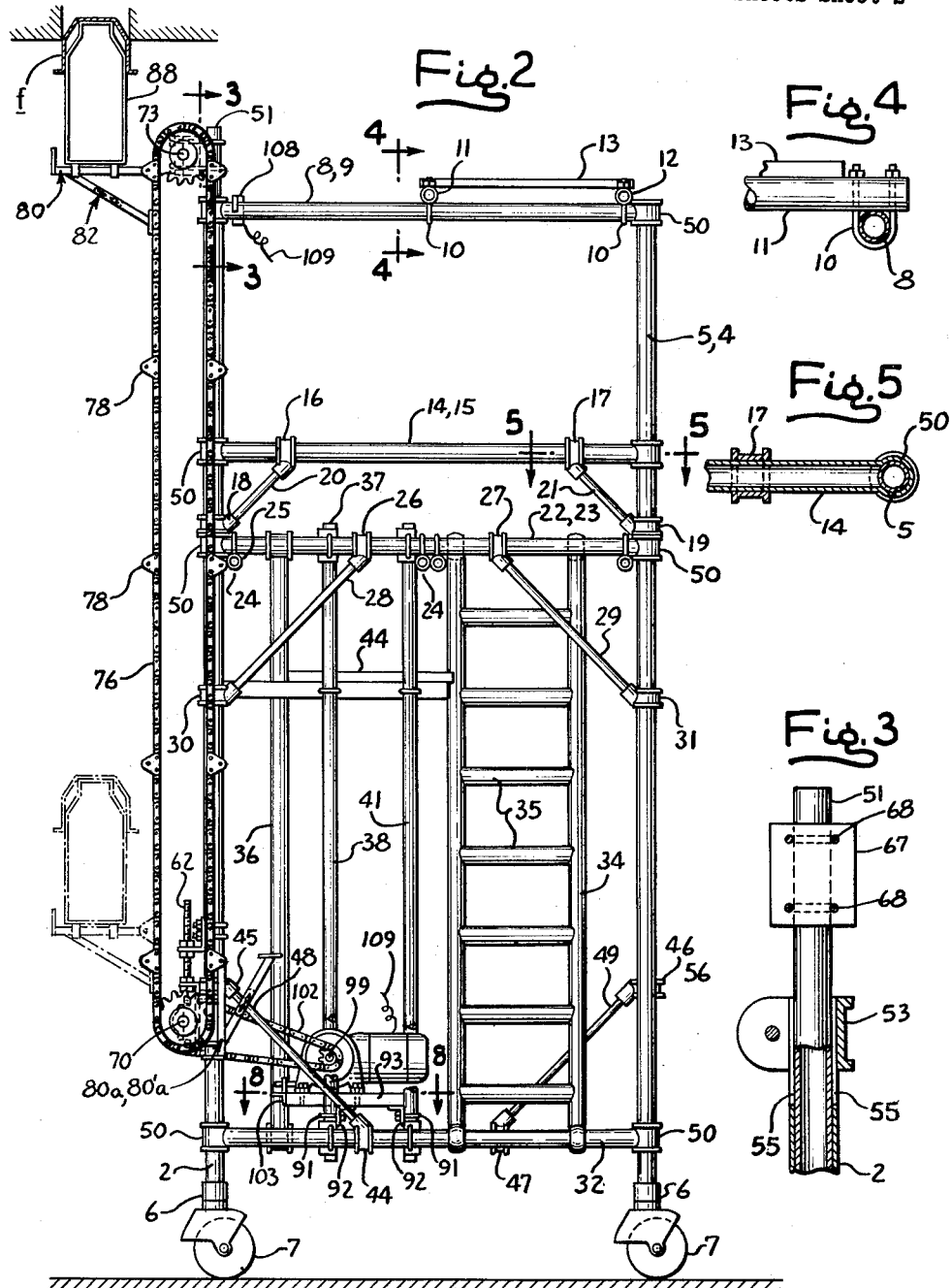

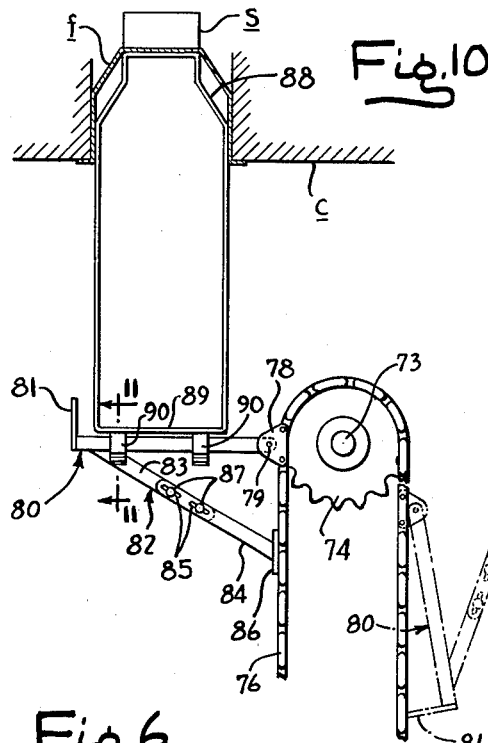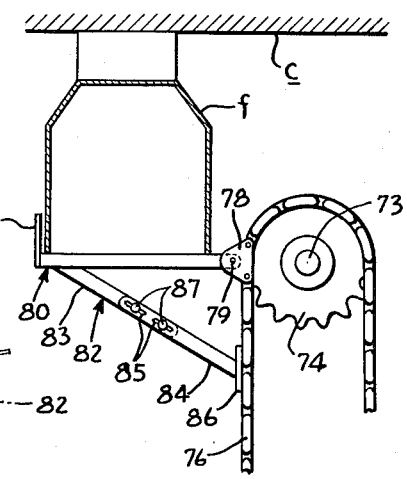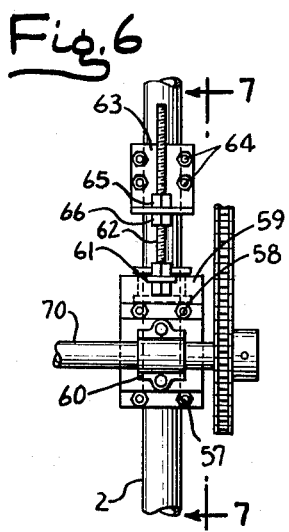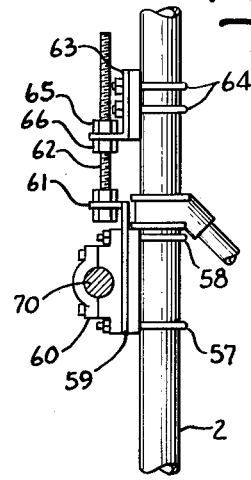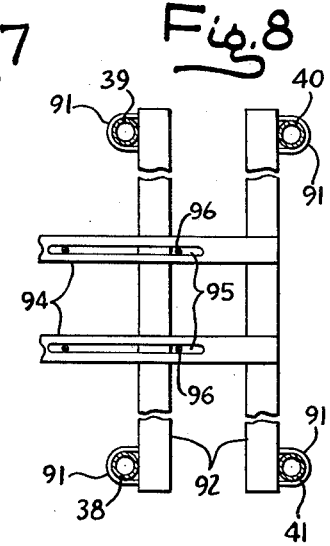

United States Patent Office 3,018,842
Patented Jan. 30, 1962

3,018,842
MOTOR DRIVEN FIXTURE SCAFFOLD
Cornelius W. Abrell, La Grange Highlands, Ill.
(300 W. Washington St., Chicago 6, Ill.)
Filed Aug. 31, 1959, Ser. No. 837,177
9 Claims. (Cl. 182—129)

This invention relates to scaffolding and, more particularly, to a mobile scaffold for use in the installation of lighting fixtures.

When lighting fixtures are being installed in the ceiling of a room or building, it is the usual practice to erect a scaffold or employ a ladder upon which the electrician can stand while mounting the fixture in place. The terminal box or other support for the fixture is usually provided with holes which match corresponding holes in the fixture so that when the fixture is placed against the support with the holes aligned, the electrician can bolt the fixture in place. In carrying out this procedure it is necessary that the electrician hold the fixture in the proper position against the support with one hand and manipulate the mounting bolts or screws with a screwdriver, or the like, in the other hand. If the fixture is relatively long, as is true of many fluorescent lighting fixtures, it is usually necessary to utilize a helper to hold the fixture so that the bolt holes are in alignment with the holes in the support. Often in these situations the helper and/or the electrician have difficulty manipulating the fixture into proper position and holding it there by hand since a slight release in upward pressure against the fixture will cause the fixture to move and thus require that it be repositioned before the installation can be completed.

A further problem in connection with the installation of these fixtures lies in the fact that they must often be manually transported to the top of the ladder or scaffold, one or more at a time. When relatively long fluorescent fixtures are being installed a helper must climb up the scaffold with the fixture in hand. This frequently increases the work-time for a job requiring many such fixtures to be installed, and, furthermore, since these fixtures are rather bulky, there is always the possibility that they may become dented or otherwise damaged. Consequently, the installation of a large number of fixtures is quite time-consuming and expensive.

It is, therefore, a primary object of the present invention to provide a scaffold which is capable of elevating a lighting fixture to its mounted position at or near the ceiling and holding the fixture at said position so as to eliminate the necessity of having the fixture held by hand, whereby the workman is thereafter able to use both hands for purposes of fastening the fixture in place.

It is also an object of the present invention to provide a scaffold of the type stated which embodies a power driven endless conveyor for purposes of lifting and holding the fixture and in which the conveyor is controllable for movement in either direction by a workman standing on the scaffold.

It is a further object of the present invention to provide a scaffold of the type stated in which the fixture can be readily placed on the conveyor and then elevated, thereby eliminating the necessity of manually lifting the fixtures up to the top of the scaffold.

It is another object of the present invention to provide a scaffold of the type stated wherein the vertical position of the conveyor can be easily adjusted and set up in accordance with the height at which the scaffold is erected.

It is an additional object of the present invention to provide a scaffold of the type stated in which the conveyor is capable of supporting recessed-type fixtures in position for mounting within the ceiling of a room.

The attainment of the above and further objects of the present invention will be apparent from the following specification taken in conjunction with the accompanying drawing forming a part thereof.

In the drawing:
FIG. 1 is a front elevational view of a scaffold constructed in accordance with and embodying the present invention;
FIG. 2 is a side elevational view thereof and showing the manner in which the lighting fixtures are supported and conveyed;
FIGS. 3, 4 and 5 are fragmentary sectional views taken along lines 3—3, 4—4 and 5—5, respectively, of FIG. 2;
FIG. 6 is a fragmentary front elevational view, on an enlarged scale, of one of the conveyor chain adjusting mechanisms and forming part of the present invention;
FIG. 7 is a fragmentary sectional view taken along line 7—7 of FIG. 6;
FIG. 8 is a fragmentary sectional view taken along line 8—8 of FIG. 2;
FIG. 9 is a fragmentary sectional view taken along line 9—9 of FIG. 1;
FIG. 10 is a fragmentary side elevational view of the upper end of the conveyor and showing a fixture held in position prior to fastening the fixture in place;
FIG. 11 is a fragmentary sectional view taken along line 11—11 of FIG. 10; and
FIG. 12 is a fragmentary side elevational view similar to FIG. 10 and showing a fixture held in position prior to fastening it in place, the hangers being removed from the conveyor flight bars.

Like reference numerals designate like parts throughout the drawings.

Referring now in more detail to the drawings which illustrate a preferred embodiment of the present invention, A designates a scaffold comprising an upstanding framework 1 having four vertical corner posts 2, 3, 4, 5 fabricated of steel tubing. At their lower ends the corner posts 2, 3, 4, 5 each have casters 6 which are swivelly connected thereto, and the casters 6 are each provided with floor-contacting caster wheels 7. At their upper ends the corner posts 2, 5 are rigidly cross connected by a horizontally extending upper cross beam 8 and, similarly, the corner posts 3, 4 are rigidly joined at their upper ends by an upper cross beam 9 which is parallel to the cross beam 8. Rigidly secured to the cross beams 8, 9 by means of U-bolts 10 are spaced parallel transverse bars 11, 12 which extend at right angles to the beams 8, 9 and support a table 13. Also secured to the corner posts 2, 3, 4, 5 in downwardly spaced parallel relation to the cross beams 8, 9 are intermediate cross beams 14, 15, and secured to the cross beams 14, 15 in spaced relation from the ends thereof are elbow sleeves 16, 17. A similar set of elbow sleeves 18, 19 is secured to the corner posts downwardly from the intermediate cross beams 14, 15 and joining the elbow sleeves 16, 17, 18, 19 are diagonal struts 20, 21.

Adjacent to and downwardly from the sleeves 18, 19 is a pair of lower intermediate cross beams 22, 23, and extending transversely of the cross beams 22, 23 and secured thereto by means of U-bolts 24 is a plurality of parallel tubular members 25. Mounted on the cross beams 22, 23 are elbow sleeves 26, 27 into which are socketed diagonal struts 28, 29, the lower ends of which fit into elbow sleeves 30, 31 mounted on the corner posts 2, 3, 4, 5. A short distance upwardly from the casters 6 the framework 1 has a pair of lower cross beams 32, 33 and rigidly attached at its lower end to the lower cross beam 32 is a ladder 34 having conventional ladder rungs 35. The ladder 34 extends diagonally upwardly.

within the framework 1 and is attached at its upper end to the intermediate cross beam 23. Rigidly secured to the lower cross beam 33 and to the intermediate cross beam 22, is a diagonal brace bar 36 which lies adjacent to the front corner posts 2, 3.

Secured at their top and bottom ends to the cross beams 26, 27, 32, 33 by means of U-bolts 37 are four spaced parallel vertical uprights 38, 39, 40, 41. Each of the uprights 38, 39, 40, 41 is located forwardly of the ladder 34, and welded, bolted or otherwise rigidly secured to the uprights 38, 39, 40, 41 downwardly from the upper end of the ladder 34 are spaced parallel angle members 42, 43, upon which is mounted a plywood platform 44. Connected to the cross beams 32, 33 and to the corner posts 2, 4 by means of elbow sleeves 44, 45, 46, 47 is a pair of diagonal brace bars 48, 49 which are located on opposite sides of the framework 1. The several cross beams 8, 9, 14, 15, 22, 23, 32, 33 are each provided at their opposite ends with connector sleeves 50 which encircle the corner posts (FIG. 5) and through which the cross beams receive the corner posts. These sleeves 50 are of a type ordinarily used for joining the structural members of scaffolds together, and, therefore, are not shown or described in further detail herein.

Telescopically fitted within the front corner posts 2, 3 and projecting upwardly therefrom are extensible vertical frame members 51, 52 which are adjustably secured to the corner post 23 by means of clamps 53, 54. Furthermore, the upper ends of the corner posts 2, 3 may be provided with lengthwise extending split portions 55 over which the clamps 53, 54 are disposed so that upon tightening of the clamping bolts 56 the upper ends of the posts 2, 3 will firmly grip the vertical frame members 51, 52.

Mounted on the corner posts 2, 3 adjacent to but upwardly from the cross beams 32, 33 by means of U-bolts 57, 58 are identical bearing plates 59 upon which are bolted horizontally aligned journal bearings 60, 60'. Welded or otherwise rigidly secured to the upper end of each bearing plate 59 is a flange 61 upon which is mounted an upwardly extending adjusting screw 62. The adjusting screw 62 projects through an angle plate 63 which is secured to the posts 2, 3 upwardly of the bearings 60 by means of U-bolts 64. Threaded onto each adjusting screw 62 are nuts 65, 66 whereby the U-bolts 57, 58 can be loosened and the nuts 65, 66 turned to shift the bearings 60 upwardly and downwardly along the posts 2, 3, and for purposes more fully appearing. Adjacent the upper ends of the vertical frame members 51, 52 are spaced journal bearings 67, 67' which are similar to the bearings 60, 60' previously described. The bearings 67, 67' are adjustably clamped to the frame members 51, 52 by means of U-bolts 68, 69.

Rotatably mounted in the journal bearings 60, 60' is a lower horizontally extending shaft 70 having sprockets 71, 72 rigidly secured thereon adjacent its ends. Similarly, an upper horizontally extending shaft 73 is journalled in the bearings 67, 67', and the shaft 73 has a pair of sprockets 74, 75 rigidly mounted thereon in vertical alignment with the sprockets 71, 72 respectively. Trained around the sprockets 71, 72, 74, 75 are spaced parallel endless roller chains 76, 77 each of which has a plurality of pivot blocks 78 attached thereto at spaced intervals along the chains 76, 77. Furthermore, the pivot block 78 in each chain 76, 77 is preferably in horizontal alignment with the corresponding pivot block in the other chain. Swingably mounted on a pair of horizontally aligned pivot blocks 78 by means of pivot pins 79 is a pair of spaced identical flight bars 80, 80', the outer ends of which have stop shoulders 81. Bolted, welded or otherwise rigidly secured to each of the flight bars 80, 80' intermediate the pivot pins 79 and stop shoulders 81 is an adjustable supporting leg 82 having sections 83, 84, each having lengthwise extending slots 85. One end of the section 84 has a foot plate 86 which rests against the roller chain upon which the flight bar is mounted. The relative positions of the two sections 83, 84 are adjusted by means of clamping bolts 87. Thus the bolts 87 may be loosened and the section 84 shifted so that when the foot plate 86 contacts the roller chain as shown in FIGS. 2, 10 and 12, the flight bars 80, 80' will be horizontal. Thereafter, the bolts 87 may be tightened to hold the leg 82 at the proper adjusted length. If desired, an additional pair of flight bars 80a, 80a' may be secured to another set of pivot blocks 78, the flight bars 80a, 80a' being at the lower end of the scaffold when the flight bars 80, 80' are at the upper end of the scaffold.

Removably mounted on the flight bars 80, 80' are hangers 88, 88' each having a bottom strip 89, and permanently secured to the bottom strip 89 and depending therefrom are U-shaped spring clips 90 (FIG. 11) which snugly grip the flight bars and hold the hangers 88, 88' firmly but removably on the flight bars.

Secured to the uprights 38, 39, 40, 41 by means of U-bolts 91 and adjacent the lower end of the framework 1 are spaced angles 92 having a motor support carriage 93 welded thereto. The motor support carriage 93 includes members 94 which extend transversely of the angles 92 and are formed with longitudinally extending slots 95 for receiving motor-mounting bolts 96, the latter securing a motor-transmission assembly 97 to the carriage 93. The motor includes a reversing starter, and since the motor and reversing starter are conventional they are not shown or described in detail herein.

The transmission portion 98 of the assembly 97 has a power output shaft 99 upon which is mounted a drive sprocket 100, the latter being in alignment with a driven sprocket 101 mounted on the lower shaft 70, and trained around the sprockets 100, 101 is a drive chain 102. Welded to the forward end of the motor carriage 93 is an angle 103 having an upwardly extending plate 104 formed with a hole 105 which rotatably receives a threaded adjusting nut 106 (FIG. 9). A motor-adjusting screw 107 projects through the hole 105 and is threaded into the nut 106, and the adjusting screw is also connected to the motor-transmission assembly 97. Consequently, when the bolts 96 are loosened the nut 106 can be turned to shift the assembly 97 and take up the slack in the drive chain 102. For purposes of controlling the motor, a switch 108 may be hung from one of the cross beams 8, 9 and connected to the motor by means of an electrical cable 109. The switch 108 starts and stops the motor and also controls the direction of rotation thereof.

In use the scaffold A is rolled on the caster wheels 7 to a position underneath the place at which the lighting fixture $f$ is to be installed. One or more workmen may then climb up the ladder 34 and stand on the platform 44, the height of the latter being such that the workmen can stand up and be within easy reach of the ceiling $c$. The switch 108 is then actuated to operate the motor transmission 97 which, in turn, drives the conveyor chains 76, 77, and when the flight bars 80, 80' reach the broken line position shown in FIG. 2, the switch 108 is again operated to stop the assembly 97. Thereafter the fixture $f$ can be placed over the hangers 88' by one or more workmen standing on the floor, whereupon the workman on the platform can again operate the switch 108 to cause the chains 76, 77 to lift the flight bars 80, 80' with the fixture thereon up to the position shown in full lines in FIGS. 2 and 10. When the fixture is almost at the full-line position shown, the switch 108 is operated to stop the movement of the chains, and the workman or workmen on the platform can then shift the fixture and hangers until the mounting holes in the fixture are in alignment with the mounting holes on the fixture support $s$ (FIG. 10). Then the switch 108 can then be operated to again raise the fixture very slightly until it is flush against the support, whereupon the fixture can be fastened in place.

In this regard it should be noted that since the flight bars hold the fixture firmly in the position at which the fixture is to be mounted, the workman or workmen on the platform are free to use both hands for purposes of installing the fixture in place. Furthermore, the fixture *f* can be quickly and easily loaded on to the flight bars 80, 80' by workmen standing on the floor and, therefore, the necessity of manhandling the fixtures up to the top of the scaffold is eliminated.

After the fixture has been installed, the switch 108 can be actuated to reverse the direction of travel of the chains 76, 77 to thus lower the flight bars 80, 80', at which time the workmen can swing the flight bars upwardly about the pivot pins 79 so that the flight bars lie against the chains 76, 77. Thereafter, the switch 108 can be actuated to move the retracted flight bars around to the broken line position shown in FIG. 10. Also, during this movement, the other pair of flight bars 80*a*, 80*a*' will travel around the lower sprockets 71, 72 and assume the broken line position shown in FIG. 2 so as to be ready to receive another fixture *f*. It will, of course, be apparent that when the hangers 88, 88' are used, it is necessary to remove them from the flight bars before swinging the flight bars up to their retracted position against the conveyor chains 76, 77. The scaffold A may then be rolled to the next station at which a fixture is to be installed. Another set of hangers must then be placed on the flight bars 80*a*, 80*a*' before placing the fixture thereon, whereupon the foregoing procedure for installing the fixture is repeated.

FIGS. 2 and 10 show the fixture *f* recessed within the ceiling *c*. However, the fixture *f* can be elevated to a place where it is mounted adjacent the ceiling as shown in FIG. 12 or to a place wherein the fixture is attached to a rod which depends from the ceiling. Depending upon the type of fixture, it may be possible to omit the use of the hangers 88, 88' as illustrated in FIG. 12 and support the fixtures directly on the flight bars.

The adjustment of the shafts 70, 73 and bearings associated therewith relative to the ceiling is easily accomplished for purposes of accurately locating the upper and lower ends of the chains 76, 77. For example, the clamps 53, 54 can be loosened to extend the frame members 51, 52 upwardly and, at the same time, the U-bolts holding the bearings 60, 60', 67, 67' can be loosened so that both shafts 70, 73 can be shifted upwardly a desired equal amount. Furthermore, the U-bolts 91 can be loosened to raise the carriage 93 and assembly 97 upwardly a similar amount. The U-bolts 91, 92, 68, 69 can then be tightened to clamp the carriage 93 and upper bearings 67, 67' in place. If necessary the bolts 65, 66 can be turned to shift the adjusting screws 62 for the purpose of taking up the slack in the conveyor chains 76, 77, whereupon the U-bolts 57, 58 can be tightened to clamp the bearing plates 59 firmly in place. Finally, the slack in the drive chain 106 can be taken up by the adjusting nut 106.

Since the height at which the fixtures are to be installed may vary from one job to another, it may be necessary to add an additional frame section to the scaffold for purposes of increasing the overall height thereof. In such case it is only necessary to loosen the U-bolts 68, 69 and remove the upper bearings 67, 67' whereupon an additional framework may be coupled to the corner posts 2, 3, 4, 5. The bearings 67, 67' can then be mounted on the upper end of said additional framework and a longer pair of roller chains 76, 77 can then be substituted for those previously on the scaffold. If any slack appears in the new chains, it may be taken up in the manner previously described. The new chains may be equipped with the flight bars or the flight bars can be easily removed from the previously used chains by simply knocking out the pins 79 and installing flight bars on the pivot blocks of the new roller chains. The height of the platform 44 may also be changed as required.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and desired to be secured by Letters Patent is:

1. A scaffold for use in the installation of lighting fixtures and the like, said scaffold comprising an upstanding framework, a pair of spaced flexible members extending upwardly along one side of the framework, a fixture-supporting bar mounted on each member and normally projecting outwardly therefrom with the bar on one member in alignment with the bar on the other member to constitute a support for a lighting fixture extending therebetween, means for driving the flexible members to shift the bars and fixture thereon upwardly along the frame to a position at which the fixture is to be mounted and to hold the fixture at said position, and control means at the upper end of the frame for stopping, starting and reversing the direction of travel of the flexible members.

2. A scaffold for use in the installation of lighting fixtures and the like, said scaffold comprising an upstanding framework, a pair of spaced flexible members extending upwardly along one side of the framework, a fixture-supporting bar pivotally mounted on each member, each said bar being swingable from a retracted position wherein it lies along the member to an extended position wherein it projects away from the member, the bar on one member being in alignment with the bar on the other member to constitute a support for a fixture extending therebetween, means for driving the flexible members to shift the bars and fixture thereon upwardly along the frame to a position at which the fixture is to be mounted and to hold the fixture at said position, and control means at the upper end of the frame for stopping, starting and reversing the direction of travel of the flexible members.

3. A scaffold for use in the installation of lighting fixtures and the like, said scaffold comprising an upstanding framework, a pair of spaced flexible members extending upwardly along one side of the frame, a fixture-supporting bar pivotally mounted on each member, each said bar being swingable from a retracted position wherein it lies along the member to an extended position wherein it projects away from the member, the bar on one member being in alignment with the bar on the other member, a hanger carried by each bar and the hangers constituting a support for a fixture extending between the bars, means for driving the flexible members to shift the bars and fixture thereon upwardly along the frame to a position at which the fixture is to be mounted and to hold the fixture at said position, and control means at the upper end of the frame for stopping, starting and reversing the direction of travel of the flexible members.

4. A scaffold for use in the installation of lighting fixtures and the like, said scaffold comprising an upstanding framework, a pair of spaced horizontal shafts at the upper and lower ends, respectively, of the framework and adjacent to one side of the framework, a pair of spaced sprockets on each shaft and each sprocket on the upper shaft being substantially aligned with one sprocket on the lower shaft, a roller chain trained around each set of aligned sprockets, a fixture-supporting bar mounted an each roller chain and normally projecting outwardly therefrom with the bar on one chain in horizontal alignment with the bar on the other chain, so that the bars constitute a support for a lighting fixture extending therebetween, driving means operatively connected to the lower shaft for moving the roller chains and thereby shift the bars upwardly along the frame to carry a fixture on said bars to the position at which the fixture is to be mounted in place, and control means at the upper end of the frame for stopping and starting the driving means.

5. A mobile scaffold for use in the installation of lighting fixtures and the like, said scaffold comprising an upstanding framework, a pair of vertical frame members telescopically mounted within the framework at the upper end thereof and adjustable to a plurality of vertical positions upwardly of the framework, bearing means carried by the frame members, an upper horizontally extending shaft rotatably mounted in said bearing means, bearing means carried by the framework at the lower end thereof, a lower horizontal shaft rotatably mounted in the last-mentioned bearing means, each said bearing means being releasably clamped to the frame members and framework, respectively, whereby the horizontal position of the two shafts can be adjusted, a pair of spaced flexible members extending around said shafts and extending upwardly along one side of the framework, a fixture-supporting bar mounted on each member with the bar on one member being in alignment with the bar on the other member to constitute a support for a fixture extending therebetween, driving means at the lower end of the framework and operatively connected to the lower shaft to operate the members and shift the bars and fixture thereon upwardly along the frame to a position at which the fixture is to be mounted and to hold the fixture at said position, and control means at the upper end of the framework for actuating the driving means.

6. A mobile scaffold for use in the installation of lighting fixtures and the like, said scaffold comprising an upstanding framework, a pair of vertical frame members telescopically mounted within the framework at the upper end thereof and adjustable to a plurality of vertical positions upwardly of the framework, bearing means carried by the frame members, an upper horizontally extending shaft rotatably mounted in said bearing means, bearing means carried by the framework at the lower end thereof, a lower horizontal shaft rotatably mounted in the last-mentioned bearing means, each said bearing means being releasably clamped to the frame members and framework, respectively, whereby the horizontal position of the two shafts can be adjusted, a pair of spaced flexible members extending around said shafts and extending upwardly along one side of the framework, a fixture-supporting bar swingably mounted on each member with the bar on one member being in alignment with the bar on the other member to constitute a support for a fixture extending therebetween, driving means at the lower end of the framework and operatively connected to the lower shaft to operate the members and shift the bars and fixture thereon upwardly along the frame to a position at which the fixture is to be mounted and to hold the fixture at said position, means for adjusting the height of the driving means along the framework, and control means at the upper end of the framework for actuating the driving means.

7. A mobile scaffold for use in the installation of lighting fixtures and the like, said scaffold comprising an upstanding framework, a pair of vertical frame members telescopically mounted within the framework at the upper end thereof and adjustable to a plurality of vertical positions upwardly of the framework, bearing means carried by the frame members, an upper horizontally extending shaft rotatably mounted in said bearing means, bearing means carried by the framework at the lower end thereof, a lower horizontal shaft rotatably mounted in the last-mentioned bearing means, each said bearing means being releasably clamped to the frame members and framework, respectively, whereby the horizontal position of the two shafts can be adjusted, a pair of spaced flexible members extending around said shafts and extending upwardly along one side of the framework, a fixture supporting bar pivotally supported on each member, each said bar being swingable from a retracted position wherein it lies along the member to an extended position wherein it projects away from said member, the bar on one member being in horizontal alignment with the bar on the other member to constitute a support for a fixture extending therebetween, driving means at the lower end of the framework and operatively connected to the lower shaft to operate the members and shift the bars and fixture thereon upwardly along the frame to a position at which the fixture is to be mounted and to hold the fixture at said position, and control means at the upper end of the framework for actuating the driving means.

8. A mobile scaffold for use in the installation of lighting fixtures and the like, said scaffold comprising an upstanding framework, a pair of vertical frame members telescopically mounted within the framework at the upper end thereof and adjustable to a plurality of vertical positions upwardly of the framework, bearing means carried by the frame members, an upper horizontally extending shaft rotatably mounted in said bearing means, bearing means carried by the framework at the lower end thereof, a lower horizontal shaft rotatably mounted in the last-mentioned bearing means, each said bearing means being releasably clamped to the frame members and framework, respectively, whereby the horizontal position of the two shafts can be adjusted, a pair of spaced flexible members extending around said shafts and extending upwardly along one side of the framework, a fixture supporting bar pivotally supported on each member, each said bar being swingable from a retracted position wherein it lies along the member to an extended position wherein it projects away from said member, the bar on one member being in horizontal alignment with the bar on the other member and each bar having a hanger removably mounted thereon to support a fixture extending transversely of the bars, driving means at the lower end of the framework and operatively connected to the lower shaft to operate the members and shift the bars and fixture thereon upwardly along the frame to a position at which the fixture is to be mounted and to hold the fixture at said position, and control means at the upper end of the framework for actuating the driving means.

9. A scaffold for use in the installation of lighting fixtures and the like, said scaffold comprising an upstanding framework, a conveyer mounted on said framework and having spaced members constituting a support for a lighting fixture extending therebetween, and means for driving said conveyor to elevate the support with the fixture thereon upwardly along the framework to a position at which the fixture is to be mounted and to hold the fixture at that position, and control means at the upper end of the scaffold for stopping, starting, and reversing the direction of travel of the conveyor.

References Cited in the file of this patent

UNITED STATES PATENTS

| | | |
|---|---|---|
| 412,956 | Humphrey | Oct. 15, 1889 |
| 2,119,444 | Sampiery | May 31, 1938 |
| 2,677,580 | Minzenmayer | May 4, 1954 |
| 2,882,100 | Bank | Apr. 14, 1959 |
| 2,938,595 | Miller | May 31, 1960 |